United States Patent
Fleiner et al.

(10) Patent No.: US 7,240,155 B2
(45) Date of Patent: Jul. 3, 2007

(54) DECISION MECHANISMS FOR ADAPTING RAID OPERATION PLACEMENT

(75) Inventors: Claudio Matthias Fleiner, San Jose, CA (US); Richard Andrew Golding, San Francisco, CA (US); Deepak R. Kenchammana-Hosekote, San Jose, CA (US); Omer Ahmed Zaki, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 454 days.

(21) Appl. No.: 10/957,167

(22) Filed: Sep. 30, 2004

(65) Prior Publication Data

US 2006/0069716 A1   Mar. 30, 2006

(51) Int. Cl.
*G06F 12/16* (2006.01)
*G06F 15/16* (2006.01)

(52) U.S. Cl. .............. 711/114; 711/100; 711/112; 711/154

(58) Field of Classification Search .............. 711/100, 711/112, 114, 154; 709/203
See application file for complete search history.

(56) References Cited

U.S. PATENT DOCUMENTS

| | | | |
|---|---|---|---|
| 5,778,426 A * | 7/1998 | DeKoning et al. | 711/122 |
| 6,148,414 A | 11/2000 | Brown et al. | |
| 6,219,753 B1 * | 4/2001 | Richardson | 711/114 |
| 6,223,252 B1 * | 4/2001 | Bandera et al. | 711/114 |
| 6,412,079 B1 | 6/2002 | Edmonds et al. | |
| 6,718,434 B2 * | 4/2004 | Veitch et al. | 711/170 |
| 2002/0066050 A1 * | 5/2002 | Lerman et al. | 714/6 |
| 2003/0070043 A1 | 4/2003 | Merkey | |
| 2003/0084397 A1 | 5/2003 | Peleg | |
| 2003/0120723 A1 | 6/2003 | Bright et al. | |
| 2003/0149750 A1 | 8/2003 | Franzenburg | |

OTHER PUBLICATIONS

K. Amiri et al., "Highly concurrent shared storage," Proceedings of the International Conference On Distributed Computing Systems, Taipei, Apr. 2000.
K. Amiri et al., "Dynamic Function Placement for Data-intensive Cluster Computing," USENIX Annula Technical Conference, San Diego, CA, Jun. 2000.
S. Frolund et al., "FAB: enterprise storage systems on a shoestring," In Proceedings 9th Workshop on Hot Topics In Operating Systems, May 2003.

(Continued)

*Primary Examiner*—Tuan V. Thai
(74) *Attorney, Agent, or Firm*—Joseph P. Curtin, L.L.C.

(57) ABSTRACT

A client node of a distributed storage system adaptive determines on an operation-by-operation basis whether to process a network-RAID IO operation (IO request) locally at the client node or to forward the IO request to a storage server of the system for processing. The client node determines to process the requested network-RAID operation at the client node when a local estimator for a type of the requested network-RAID operation is less than a central estimator for the type of the requested network-RAID operation. Otherwise, the client node determines to process the requested network-RAID operation at a storage server when the local estimator for the type of the requested network-RAID operation is greater than the central estimator for the type of the requested network-RAID operation.

28 Claims, 4 Drawing Sheets

OTHER PUBLICATIONS

E. K. Lee et al., "Petal: Distributed Virtual Disks," In Proceedings 7th International Conference on Architectural Support For Programming Languages and Operating Systems 1996.

D. Long et al., "Swift/RAID: a distributed RAID system," Computing System, 7(3), 1994.

* cited by examiner

DECISION MECHANISMS FOR ADAPTING RAID OPERATION PLACEMENT

BACKGROUND OF THE INVENTION

1. Field of the Invention

The present invention relates to distributed storage systems. More particularly, the present invention relates to a system and a method for adaptively determining whether to process a network-RAID operation locally at a client node of a distributed storage system or centrally at a storage, or coordination, server of the system.

2. Description of the Related Art

It is often necessary in a distributed storage system to read or write data redundantly that has been striped on more than one storage server (or target). Such a system configuration is referred to as a "network-RAID" because the function of a RAID controller is performed by the network protocol of the distributed storage system by coordinating IO operations that are processed at multiple places concurrently in order to ensure correct system behavior, both atomically and serially. Distributed storage systems using a network-RAID protocol can process, or coordinate, a network-RAID-protocol IO request (IO request) locally at a client node or the request can be forwarded to a storage server or a coordination server for processing. For example, one client node may locally write data to a particular data location, while another client node may choose to forward a read or a write request for the same data location to a shared, or coordination, server.

FIG. 1 depicts an exemplary distributed storage system 100 in which a plurality of storage servers 101a–101c and a plurality of client nodes 102a–102c process read and write requests relating to redundant data using a network-RAID protocol. Storage servers 101a–101c are communicatively coupled to client nodes 102a–102c through a network 103. While only three storage servers 101a–101c and three client nodes 102a–102c are shown in FIG. 1, it should be understood that exemplary distributed storage system 100 can have any number of storage servers and client nodes.

Exemplary distributed storage systems are disclosed by, for example, K. Amiri et al., "Highly concurrent shared storage," $20^{th}$ Intl. Conf. on Distributed Computing Systems, April 2000; K. Amiri et al., "Dynamic function placement for data-intensive cluster computing," In Proceedings Of the Usenix Ann. Technical Conference, June 2000; S. Frolund et al., "FAB: enterprise storage systems on a shoestring," In Proceedings $9^{th}$ Workshop on Hot Topics In Operating Systems, May 2003; E. Lee et al., "Petal: distributed virtual disks," In Proceedings $7^{th}$ International Conference on Architectural Support For Programming Languages and Operating Systems, 1996; and D. Long et al., "Swift/RAID: a distributed RAID system," Computing System, 7(3), 1994.

Often the best choice of whether a network-RAID-protocol IO request should be processed locally at a client node or centrally by a storage, or a coordination, server varies on a request-by-request basis as network and system conditions vary and based on the type of IO request. Such a choice depends on several factors, such as the amount of contention in the workload of the client node when multiple clients are trying to read or write the same data, the performance of the client node, and the network capacity that connects the client node to storage.

A high level of contention in the workload of a client node can cause more than a 20% increase in response time to an IO request. In some cases, a high level of contention can cause a response time that is more than 200% greater than the response time for non-contention conditions. Thus, when the level of contention is high and/or when a client node is heavily loaded, it is often better for the client node to forward the request and a copy of the data associated with the request to a storage server having more resources and let the storage server coordinate the IO request. Similarly, when a client node has a low-bandwidth connection to storage while a storage server has a faster connection to storage, an IO request is best forwarded to the storage server, thereby minimizing the amount of data sent over the slow link of the client node. Further, during periods of high contention when multiple clients are trying to read or write the same data, it may be faster for a client node to forward all requests to a storage server rather than have client nodes contend with each other on a local basis.

Many conventional network-RAID protocols provide a choice of whether coordination of a network-RAID operation should be performed separately at a client node or centralized in a shared server. Having a client node coordinate IO requests in the common situation of a low level of contention and reasonably fast network connection, however, provides better performance than sending the IO request to a storage server or a coordination server because less work is performed. The data goes directly between the client node and the storage servers, such as depicted in FIG. 2A in which a client node 201 is depicted as coordinating a network-RAID operation with storage servers 202a and 202b. In contrast, FIG. 2B depicts a client node 210 as forwarding an IO request plus any data that is associated with the IO request to a coordination server 211. Coordination server 211 then coordinates the network-RAID operation with storage servers 212a and 212b. Additionally, by processing an IO request at a client node, the possibility is avoided that a shared storage server may become overloaded.

An exemplary distributed storage system using a network-RAID protocol that determines whether to process an IO request locally or centrally is disclosed by K. Amiri et al., "Dynamic function placement for data-intensive cluster computing," Usenix Annual Technical Conference, June 2000. The Amiri et al. system makes periodic determinations regarding adaptively moving execution of IO processing steps from a client node to a storage server. After each determination, all subsequent IO operations are performed either locally or centrally based on the determination until the next periodic determination.

Nevertheless, what is needed is a way to adaptively determine on an operation-by-operation basis whether a network-RAID IO request is best processed locally at a client node of a distributed storage system or centrally at a coordination or at a storage server of the system.

BRIEF SUMMARY OF THE INVENTION

The present invention provides a way to adaptively determine on an operation-by-operation basis whether a network-RAID IO request is best processed locally at a client node of a distributed storage system or centrally at a coordination or at a storage server of the system.

The advantages of the present invention are provided by a system and a method for processing a network-RAID operation in a distributed storage system. The distributed storage system includes a plurality of client nodes and at least one storage server node. According to the present invention, a request for a network-RAID operation is received at a client node. The client node determines to process the requested network-RAID operation at the client node when a local estimator for a type of the requested network-RAID operation is less than a central estimator for the type of the requested network-RAID operation. The local estimator relates to a processing estimate for processing the requested network-RAID operation at the client node and the central estimator relates to a processing estimate for processing the requested network-RAID operation at a storage server. The client node determines to process the requested network-RAID operation at a storage server when the local estimator for the type of the requested network-RAID operation is greater than the central estimator for the type of the requested network-RAID operation. At least one estimator is a time-based moving average of processing times for a predetermined type of recently received network-RAID operation requests that decays over time. Alternatively, the estimator is periodically reset.

According to one exemplary embodiment of the present invention, the client node classifies the requested network-RAID operation as a read operation or a write operation before the determining where to process the requested network-RAID operation. When the requested network-RAID operation is classified as a write operation, the client node determines whether the requested network-RAID operation is a contentious network-RAID operation. If the requested write operation is a contentious network-RAID operation, the write operation is processed at the client node when a contention estimator associated with the write operation is less than a predetermined threshold value. Otherwise, the write operation is processed at the storage server when the contention estimator associated with the write operation is greater than or equal to the predetermined threshold value. An exemplary contention estimator could be a count of recently received write-operation requests that are contentious write operations that decays over time. Alternatively, the contention estimator could be periodically reset.

The client node compiles processing results for the requested network-RAID operation and uses the processing results for updating the estimator corresponding to the requested network-RAID operation. When the requested network-RAID operation is processed at the storage server, the processing results are sent to the client node for updating the estimator corresponding to the requested network-RAID operation.

BRIEF DESCRIPTION OF THE DRAWINGS

The present invention is illustrated by way of example and not by limitation in the accompanying figures in which like reference numerals indicate similar elements and in which.

DETAILED DESCRIPTION OF THE INVENTION

Figure 1:
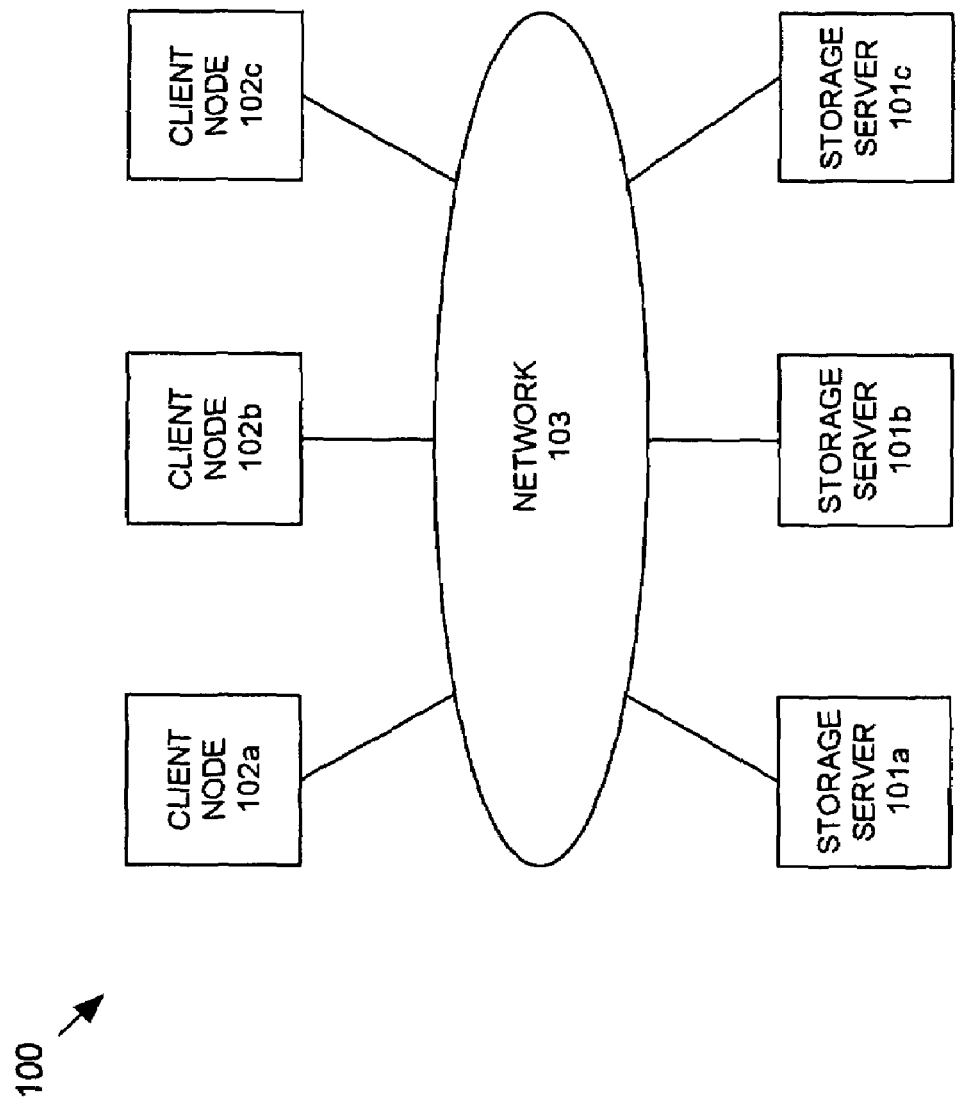
FIG. 1 depicts an exemplary distributed storage system having a plurality of storage servers coupled to a plurality of client nodes through a network.
Figure 2B:
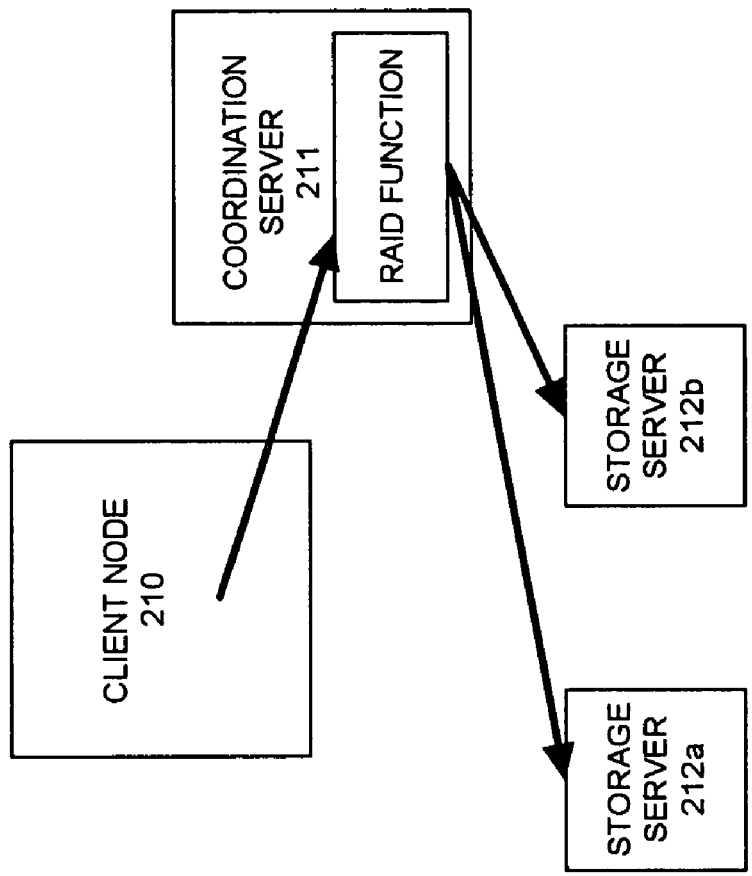
FIG. 2B depicts a client node in a distributed storage system forwarding a network-RAID-IO request to a coordination server that coordinates the IO request.
Figure 2A:
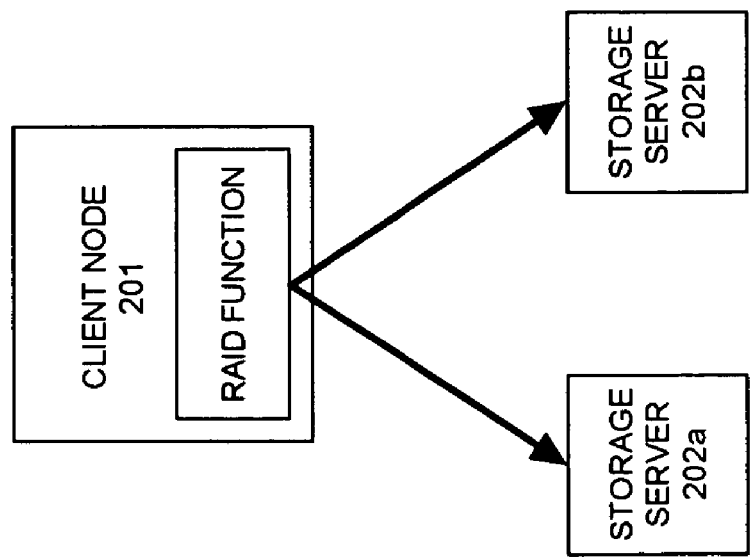
FIG. 2A depicts a client node in a distributed storage system that coordinates a network-RAID IO request.

The present invention provides a system and a method for adaptively determining at a client node of a distributed storage system on an operation-by-operation basis whether to process a network-RAID IO operation (IO request) locally at the client node or to forward the IO request to a storage server or a coordination server of the system for processing. It should be understood that for purposes of the present invention, the terms storage server and coordination server are interchangeable. Each client node makes the determination independently based on information stored locally at a client node. The network-RAID protocol then coordinates the respective actions of the nodes of the distributed storage system, either locally or centrally, based on the determination.

In one exemplary embodiment of the present invention, the determination is adaptively based on the processing times, both locally and centrally, for recently received IO requests. The processing location producing the fastest processing time for recently received IO requests is selected for processing the IO request. Thus, the present invention improves performance, both in response time and in throughput, by a client node adaptively determining where an IO request is best performed for each respective IO request received by the client node, even as the network environment and workloads change.

The present invention is also able to adapt well to several different scenarios. For example, when performing many concurrent operations with respect to shared data, the present invention moves the operation to a storage server or a coordination server, and performs operations locally when there is little contention. In particular, another exemplary embodiment of the present invention provides that the adaptive determination whether an IO request is processed locally or centrally can be additionally or alternatively based on the level of contention observed in recently received IO requests. An IO request is processed centrally when the degree of contention of recently received IO requests is greater than a predetermined threshold value.

The present invention also properly identifies periods when a client node is busy (and, thus, short of memory system bandwidth) or when the network link of the client node is busy or slow. In both situations, the present invention determines that the request is best processed by forwarding the IO request to a storage server. Additionally, the present invention is able to cope with problems that can occur in the timestamp-based network-RAID protocol when a clock of a client has drifted significantly from real time. In such a situation, a client node having an incorrect clock can, for example, have all of its IO requests rejected. Sending the requests to a central server having a correct clock allows the IO requests to be processed.

In order to make an adaptive determination according to the present invention as to where an IO request is best processed, statistical estimators are maintained relating to each IO-request type (for example, a read request or a write request) along with whether the IO-request type was processed locally or centrally. Table 1 shows an exemplary arrangement of statistical estimators for a read request and a write request.

TABLE 1

|  | Read | Write |
| --- | --- | --- |
| Local | Local read estimator | Local write estimator |
| Central | Central read estimator | Central write estimator |

For one exemplary embodiment of the present invention, each estimator is a time-based moving average that is periodically reset to zero. For example, the time when processing begins for an IO request and the time when processing of the request completes are recorded. The difference between the two times, which is the processing time for the request, is then used to update the current value of the estimator corresponding to the IO-request type. It should be understood that any estimator that aggregates the outcome of recent IO requests and that decays over time or is periodically reset is suitable for use with the present invention. Additionally, estimators having a finer operation type classification can be used. For example, IO requests could be further classified by the particular data that is addressed, the size of the IO request, and so on. Such exemplary finer classifications have been omitted from the description of the present invention for clarity of explanation.

Figure 3:
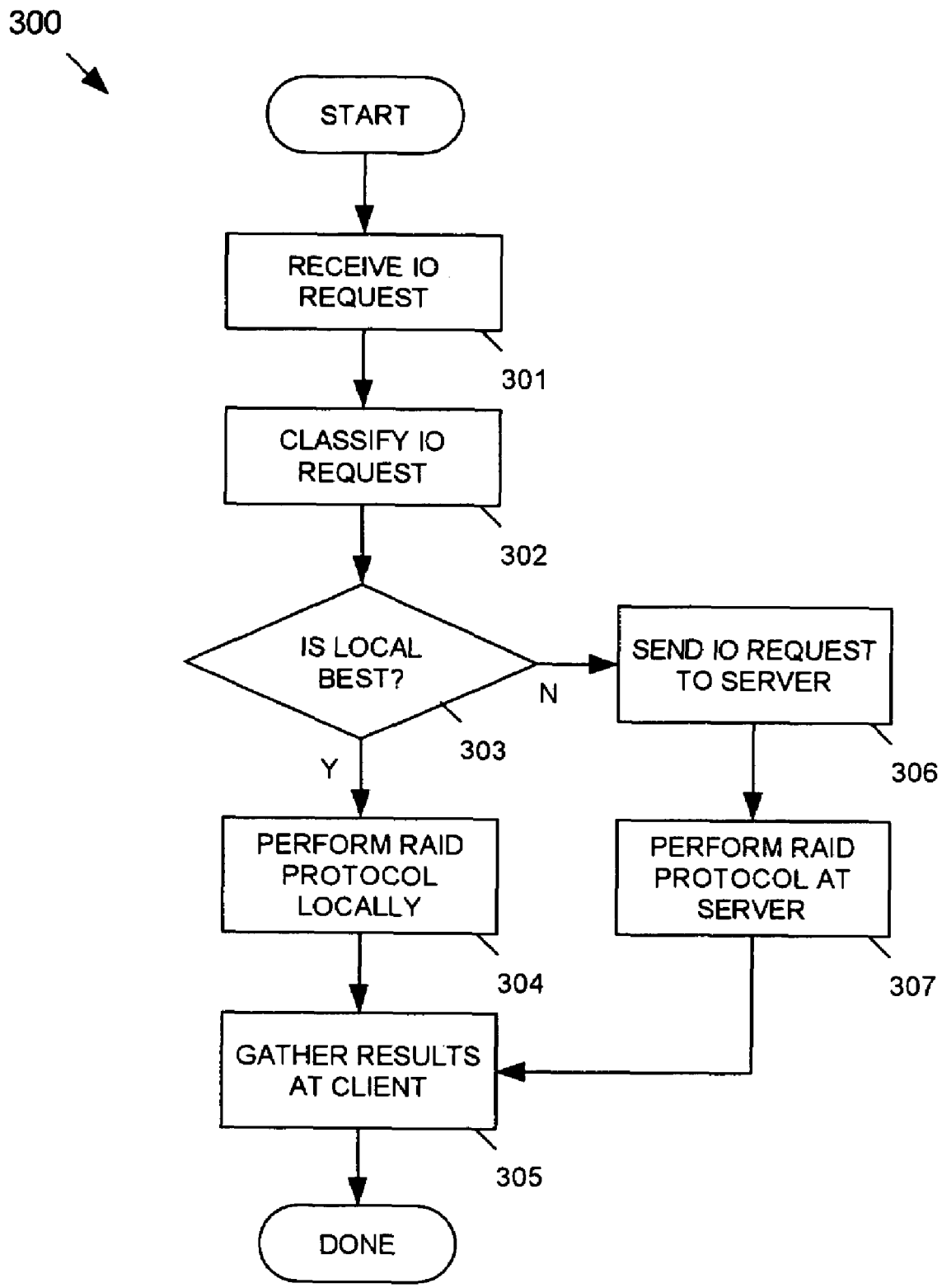
FIG. 3 shows the general flow of a method according to the present invention for determining on an operation-by-operation basis whether a network-RAID IO request is best processed locally at a client node of a distributed storage system or centrally at a storage server of the system.

FIG. 3 shows the general flow of a method 300 according to the present invention for determining on an operation-by-operation basis whether a network-RAID IO request is best processed locally at a client node of a distributed storage system or centrally at a storage server of the system. At step 301, an IO request is received by the IO subsystem of a client node. At step 302, the received request is classified by type by the IO subsystem. At step 303, it is determined whether the IO request is best executed locally or centrally based on estimator information corresponding to the IO-request type of the received IO request that is maintained by the client node. If, at step 303, it is determined that the IO request is best executed locally, flow continues to step 304 where the network-RAID protocol for the IO request is executed locally by coordinating the various nodes of the distributed storage system that perform specific read and write operations satisfying the IO request. For example, for a network RAID 5 small write request, a client node reads old data and redundancy information, such as parity, from the appropriate storage servers, computes the new redundancy information, and writes new data and redundancy information to the appropriate storage servers. Flow continues to step 305 where the processing-time results are accumulated and compiled by the client node.

If, at step 303, it is determined that the received IO request is best processed at a storage server, flow continues to step 306 where the IO request is sent to a storage server. Flow continues to step 307, where the network-RAID protocol for the IO request is executed by the storage server coordinating the nodes of the distributed storage system that perform specific read and write operations satisfying the IO request. Flow continues to step 305, where the processing-time results are gathered at the client node, completing the process. When the processing has been performed at a storage server, the results are sent from the storage server to the client node for compilation by the client node. The storage server sends the processing results back only to the client node requesting the operation because the storage server does not necessarily keep track of which particular client node(s) to which the storage server really should send the results, and because the result measured at a client node can depend on such parameters like the condition of the network link between the client node and the storage server—a parameter about which the storage server may know nothing. For example, when one of the network links is heavily loaded by some completely unrelated traffic, the unrelated traffic may slow communication between a client node and storage server, but the storage server will not be able to tell that the link is slow.

When two client nodes request operations for the same or overlapping data items, there is a possibility that the two requests will contend for the data. Note that the exact definition of contention depends on the particular network-RAID protocol that is used by the distributed storage system. One exemplary embodiment of the present invention maintains an estimator of the number of recent IO requests received by the client node that have caused contention. For example, a simple count of the number of contentious IO requests that is periodically reset to zero can be used. It should be understood that any estimator that aggregates the occurrences of recent contentious IO requests and that decays over time or is periodically reset is suitable for use with the present invention.

Figure 4:
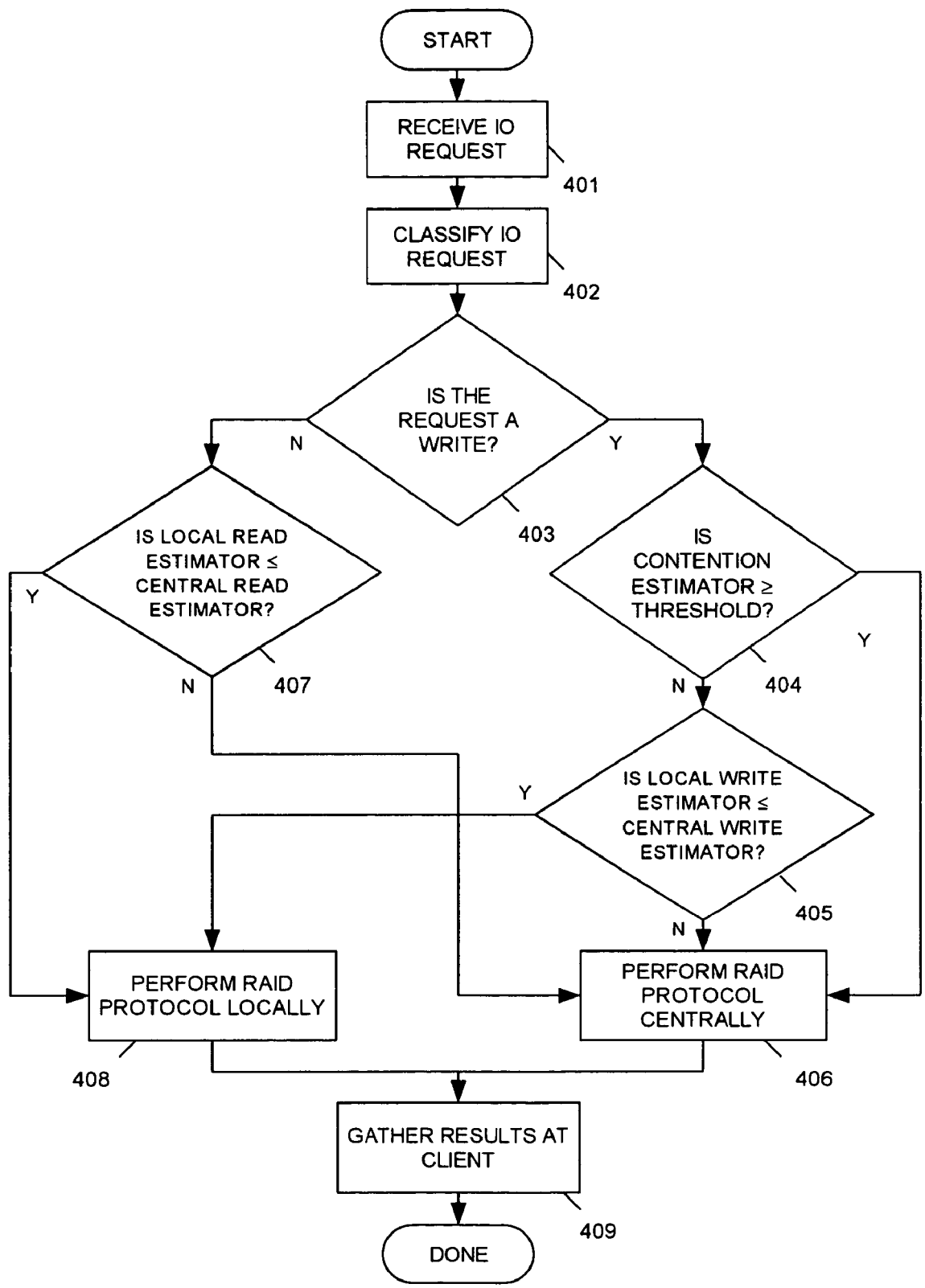
FIG. 4 shows the general flow of a method according to the present invention for determining on an operation-by-operation basis whether a contentious network-RAID IO request is best processed locally at a client node of a distributed storage system or centrally at a storage server of the system.

FIG. 4 shows the general flow of a method 400 according to the present invention for determining on an operation-by-operation basis whether a contentious network-RAID IO request is best processed locally at a client node of a distributed storage system or centrally at a storage server of the system. Generally, when the IO request is a contentious write, the request should be processed centrally; otherwise, the determination of the best location for processing the IO request is based on the appropriate local and estimators for the IO request type. At step 401, an IO request is received by the IO subsystem of a client node. At step 402, the received request is classified by type by the IO subsystem. At step 403, it is determined whether the IO request is a write operation.

If, at step 403, the IO request is a write operation, flow continues to step 404 where it is determined whether the contention estimator is greater than or equal to a predetermined threshold value. An exemplary contention estimator could be a simple count of the number of contentious IO requests that have been recently received by the client node. If, at step 404, it is determined that the contention estimator is greater than or equal to the predetermined threshold value, flow continues to step 406 where the RAID protocol is performed at a storage server. If, at step 404, it is determined that the contention estimator is less than the predetermined threshold value, flow continues to step 405 where it is determined whether the local write estimator is less than or equal to the central write estimator. When the local write estimator is less than or equal to the central write estimator, flow continues to step 408 where the RAID protocol is performed locally at the client node. When the local write estimator is greater than the central write estimator, flow continues to step 406 where the RAID protocol is performed at a storage server. Flow continues from both steps 406 and 408 to step 409 where the processing-time results are gathered at the client node, completing the process. When the processing has been performed at a storage server, the results are sent from the storage server to the client node for compilation by the client node.

If, at step 403, it is determined that the request is not a write request, flow continues to step 407 where it is determined whether the local read estimator is less than or equal to the central read estimator. If, at step 407, it is determined that the local read estimator is less than or equal to the central read estimator, then flow continues to step 408 where the RAID protocol is performed locally at the client node. If, at step 407, the local read estimator is greater than the central read estimator, flow continues to step 406 where the RAID protocol is performed at a storage server. Flow continues from both steps 406 and 408 to step 409 where the processing-time results are gathered at the client node, completing the process. When the processing has been performed at a storage server, the results are sent from the storage server to the client node for compilation by the client node.

It should be understood that the determinations of each of steps 404, 405 and 407 could be alternatively configured in a reverse determination by multiplying the estimator under consideration and its comparative threshold by −1. For example, step 404 could be alternatively configured to determined whether the contention estimator is greater than the predetermined threshold value by multiplying the contention estimator and the predetermine threshold by −1. Similarly, step 405 can be alternatively configured to determine whether the local write estimator is greater than or equal to the central write estimator, and step 407 can be alternatively configured to determine whether the local read estimator is less than or equal to the central read estimator.

Although the foregoing invention has been described in some detail for purposes of clarity of understanding, it will be apparent that certain changes and modifications may be practiced that are within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for processing a network-RAID operation in a distributed storage system, the distributed storage system including a plurality of client nodes and at least one central server node, the method comprising:
receiving a request for a network-RAID operation at a client node;
determining at the client node to process the requested network-RAID operation at the client node when a local estimator for a type of the requested network-RAID operation is less than a central estimator for the type of the requested network-RAID operation, the local estimator relating to a processing estimate for processing the requested network-RAID operation at the client node and the central estimator relating to a processing estimate for processing the requested network-RAID operation at a storage server; and
determining at the client node to process the requested network-RAID operation at a storage server when the local estimator for the type of the requested network-RAID operation is greater than the central estimator for the type of the requested network-RAID operation.

2. The method according to claim 1, wherein at least one estimator is a time-based average of processing times for a predetermined type of recently received network-RAID operation requests.

3. The method according to claim 2, wherein at least one estimator is a time-based moving average of processing times for a predetermined type of recently received network-RAID operation requests.

4. The method according to claim 2, wherein the estimator decays over time.

5. The method according to claim 2, wherein the estimator is periodically reset.

6. The method according to claim 1, wherein the type of the requested network-RAID operation is one of a read operation and a write operation.

7. The method according to claim 1, further comprising classifying the requested network-RAID operation as one of a read operation and a write operation before determining where to process the requested network-RAID operation.

8. The method according to claim 7, further comprising:
determining whether the requested network-RAID operation is a contentious network-RAID operation when the requested network-RAID operation is classified as a write operation;
determining at the client node to process the write operation at the client node when a contention estimator associated with the write operation is less than a predetermined threshold value; and
determining at the client node to process the write operation at the storage server when the contention estimator associated with the write operation is greater than or equal to the predetermined threshold value.

9. The method according to claim 8, wherein the contention estimator is a count of recently received write-operation requests that are contentious write operations.

10. The method according to claim 9, wherein the contention estimator decays overtime.

11. The method according to claim 9, wherein the contention estimator is periodically reset.

12. The method according to claim 1, further comprising compiling processing results for the requested network-RAID operation at the client node.

13. The method according to claim 12, wherein compiling the processing results includes receiving the processing results from the storage server when the requested network-RAID operation is processed by the storage server.

14. The method according to claim 1, further comprising updating the estimator corresponding to the requested network-RAID operation with processing results for the requested network-RAID operation.

15. A distributed storage system, comprising:
at least one storage server; and
a plurality of client nodes, at least one client node receiving a request for a network-RAID operation at a client node, the client node determining to process the requested network-RAID operation at the client node when a local estimator for a type of the requested network-RAID operation is less than a central estimator for the type of the requested network-RAID operation, the local estimator relating to a processing estimate for processing the requested network-RAID operation at the client node and the central estimator relating to a processing estimate for processing the requested network-RAID operation at a storage server, and determining to process the requested network-RAID operation at a central server when the local estimator for the type of the requested network-RAID operation is greater than the central estimator for the type of the requested network-RAID operation.

16. The distributed storage system according to claim 15, wherein at least one estimator is a time-based average of processing times for a predetermined type of recently received network-RAID operation requests.

17. The distributed storage system according to claim 16, wherein at least one estimator is a time-based moving average of processing times for a predetermined type of recently received network-RAID operation requests.

18. The distributed storage system according to claim 16, wherein the estimator decays over time.

19. The distributed storage system according to claim 16, wherein the estimator is periodically reset.

20. The distributed storage system according to claim 15, wherein the type of the requested network-RAID operation is one of a read operation and a write operation.

21. The distributed storage system according to claim 15, wherein the client node further classifies the requested network-RAID operation as one of a read operation and a write operation before determining where to process the requested network-RAID operation.

22. The distributed storage system according to claim 21, wherein the client system further determines whether the requested network-RAID operation is a contentious network-RAID operation when the requested network-RAID operation is classified as a write operation, determines to process the write operation at the client node when a contention estimator associated with the write operation is less than a predetermined threshold value, and determines to process the write operation at the storage server when the contention estimator associated with the write operation is greater than or equal to the predetermined threshold value.

23. The distributed storage system according to claim 22, wherein the contention estimator is a count of recently received write-operation requests that are contentious write operations.

24. The distributed storage system according to claim 23, wherein the contention estimator decays over time.

25. The distributed storage system according to claim 23, wherein the contention estimator is periodically reset.

26. The distributed storage system according to claim 15, wherein the client node compiles processing results for the requested network-RAID operation.

27. The distributed storage system according to claim 26, wherein when the requested network-RAID operation is processed by the storage server, the client node receives the processing results from the storage server.

28. The distributed storage system according to claim 15, wherein the client node updates the estimator corresponding to the requested network-RAID operation with processing results for the requested network-RAID operation.

* * * * *